Figure 1:
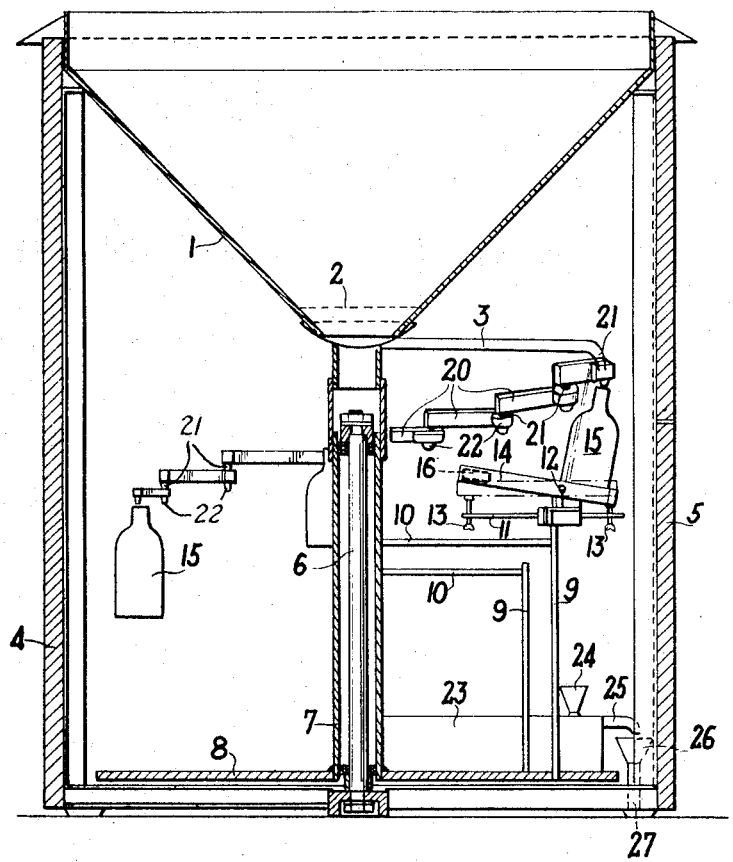

Jan. 10, 1967 A. DOURY ETAL 3,296,858
APPARATUS FOR COLLECTING AND DISTRIBUTING
ATMOSPHERIC PRECIPITATIONS
Filed Aug. 21, 1962 3 Sheets-Sheet 1

INVENTORS
ANDRÉ DOURY
CYR GRAVE
JEAN VERTUT
BY
Bacon & Thomas ATTORNEYS

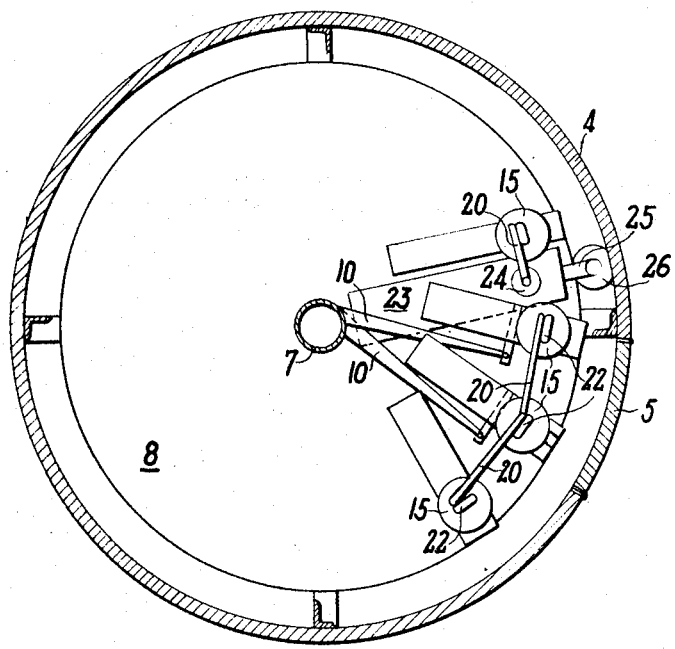

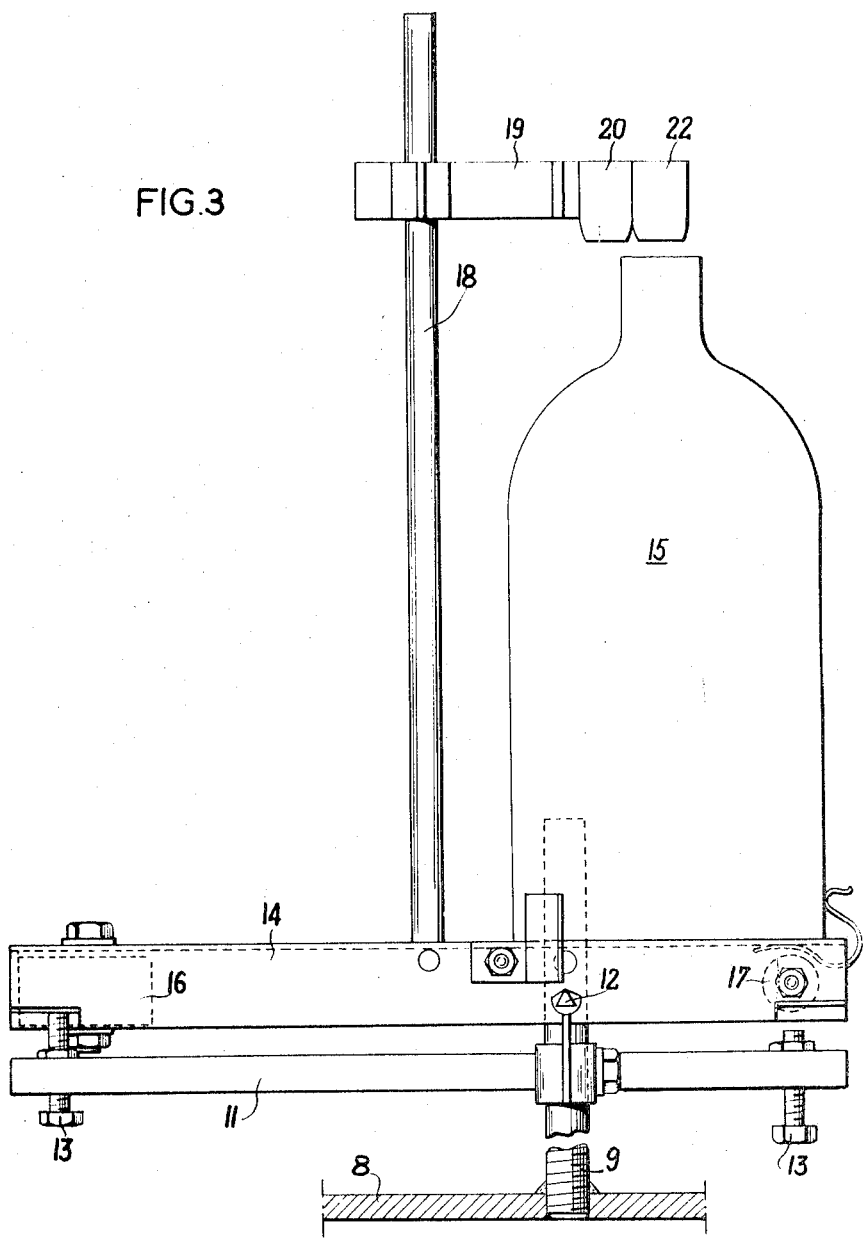

United States Patent Office 3,296,858
Patented Jan. 10, 1967

3,296,858
APPARATUS FOR COLLECTING AND DISTRIBUTING ATMOSPHERIC PRECIPITATIONS
André Doury, Vaucresson, Cyr Grave, Reze, and Jean Vertut, Paris, France, assignors to Commissariat à l'Energie Atomique, Paris, France
Filed Aug. 21, 1962, Ser. No. 218,286
Claims priority, application France, Sept. 5, 1961, 872,303
6 Claims. (Cl. 73—170)

Radio-active dusts which are projected into the upper atmosphere by nuclear tests or by plant using radio-active products, are carried back towards the ground again by atmospheric precipitation. In order to determine whether this radio-activity is greater at the beginning or at the end of a shower of rain, it is necessary to provide an apparatus which can collect fractional samples of these precipitations at different times with a view to their analysis.

The only apparatus which up to the present time enables such precipitations to be collected are essentially intended to determine the quantity of water collected during a given time. They are generally composed of a receiving vessel whose features are determined by the requirements of official meteorological departments. This vessel communicates with a storage tank, and a suitable system transmits the value of the volume of water thus collected to a recording device. The known ratio between the cross-section of the opening of the collecting vessel and that of the storage tank makes it possible to ascertain the height of water which has fallen in a region during a given time.

The adaptation of such apparatus to the measurement of the radio-activity of precipitations which are collected requires the addition of a system which not only permits the taking, for analysis, of sufficient quantities of the precipitations to enable their radio-activity to be detected, but which also permits the taking of the samples to be effected very rapidly in order to avoid the risks of sedimentation in the receiving apparatus of the radio-active dusts which are not transmitted towards the measuring system. It is also important to reduce the number of apparatus or tubes through which the fluid passes between the receiving apparatus and the measuring system in order to diminish the risks of particles whose radio-activity could not be detected becoming deposited on the various components.

The present invention has the object of providing an apparatus for receiving fractional samples of atmospheric precipitations which makes it possible for specific quantities of liquid to be collected directly.

It is concerned with a fractionising receiving apparatus for atmospheric precipitations which comprises a collector, a plurality of receiving bottles, a plurality of channels feeding these bottles, a rockable support for each bottle fast with a feed channel, means for controlling the filling of the bottle and controlling the rocking of the support of the said bottle between a position where the bottle communicates with the collector and the channel is withdrawn and a position where the filled bottle is put "out of circuit" and one end of the channel communicates with the preceding channel and the collector and the other end of the same channel communicates with the adjoining bottle.

This apparatus is extremely simple and accurate in operation. But its main advantage over known fractionising apparatus, also designed to collect equal volumes of liquid, resides in the fact that the receiving bottles are interchangeable. In fact between two visits to the apparatus, which may be daily or weekly, the solids in suspension (particularly the radio-active dusts carried down by rainfall) can be deposited by sedimentation without falsifying the strict accuracy of the measurements effected later on the contents of the bottles.

In order that the invention may be clearly understood a preferred embodiment will now be described by way of example with reference to the accompanying drawings in which:

FIGURE 1 is a diagrammatic view in elevation and in section of the apparatus of the invention for receiving and fractionising precipitations, FIGURE 2 is a plan view of the same assembly, and FIGURE 3 is an elevational view of a bottle provided with its channel and resting on the balance associated therewith.

The drawings show a precipitation collector constituted by a funnel 1 in the form of an inverted cone and provided at its lower portion with a filter 2 and a pouring spout 3. The funnel 1 rests at its upper portion on a casing 4 provided with a side access door 5. The base of the casing 4 supports a central shaft 6 which is perpendicular to the base and about which rotate a column 7 and a frame 8 connected with each other. The movable frame 8 supports:

(1) A series of receiving assemblies, each receiving assembly being composed of a supporting rod 9 fixed at its lower portion to the frame 8 and supported at its upper portion by a rod 10 whereby it is secured rigidly to the column 7, the rod 9 supporting a balance composed of a frame 11 on which is fixed a knife-edge 12 and which carries at its two ends calibrating screws 13 and a beam 14. This beam 14 constitutes the balance member and carries at one of its ends a receiving bottle 15 and at the other end a balance weight 16. A tare element 17 is fixed on the beam 14 at the end which carries the bottle and makes it possible to equilibrate the balance correctly whatever bottle is used. The beam 14 also carries a rod 18 which by means of a bearing bracket 19 supports a channel 20. This channel 20 is provided at one of its ends with a pouring spout 21 and at its other end with a funnel 22 welded on to one of its outer faces.

(2) A tank 23 serving as an overflow means and provided with a feed funnel 24 and a pouring spout 25. This overflow tank 23 discharges through the spout 25 into a funnel 26 which discharges the water towards the outside of the apparatus through a pipe 27 extending through the base of the casing 4.

As shown in the drawings, the supporting rods 9 are disposed in a circular manner around the column 7 with the radial rods 10 being all of substantially the same length. The bottles 15 and the channels 20 are also arranged in a circular manner in the casing 4 and the movable frame 8 permits the positioning and removal of the bottles 15 by the door 5 owing to its rotation about the shaft 6.

The heights of the supporting rods 9 are unequal, and decrease from that of the supporting rod of the receiving assembly fed by the pouring spout 3 to the height of the supporting rods of the last receiving assembly which, when the last bottle is filled, discharges the overflow into the funnel 24. The balances 11 are therefore slightly staggered in height and the same applies to the channels 20 supported by the brackets 19. Consequently, each pouring spout 21 is situated above the end of the adjacent channel 20 or the funnel 22 fixed on this side of the said channel, so that the pouring spout 3 remains fixed and feeds each funnel 22 through the agency of the channel or channels 20 which are highest.

First of all it feeds the funnel 22 of the first channel 20 and thence the first bottle 15, and then having filled the latter bottle and having rocked the balance which carries it, the first channel 20 which by its pouring spout 21 feeds a funnel 22 of the second channel 20, and so forth.

3

The said apparatus operates in the following manner:

The bottles 15, the respective weights of which are adjusted by the tare elements 17, are placed on each receiving assembly, so that the balances rock when the bottles 15 are filled with the desired quantity of water. By rotation of the frame 8, the funnel 22 of the first channel 20 is brought to a position below the pouring spout 3. The apparatus is now ready for operation.

During a precipitation, the water collected by the funel 1 flows through the pouring spout 3 and the funnel 22 into the first bottle 15. When this first bottle 15 has been filled with the desired quantity of water, any further drop of water causes the balance member 14 of the first receiving assembly to rock. This rocking movement causes rocking movement of the rod 18 and of the bearing bracket 19 which moves the funnel 22 from the pouring spout 3 and places the channel 20 below the said spout. The bottle 15 and the funnel 22 are thus put "out of circuit." The pouring spout 3 then feeds the first channel 20, which by means of its pouring spout 21 and of the funnel 22 of the second channel fills the second bottle 15 and so on.

When the last bottle has been filled, the beam member 14 of the last receiving assembly rocks in its turn, which has the effect of placing the pouring spout 21 of the last channel above the funnel 24 feeding the overflow tank 23. If the precipitation is heavy, this latter tank 23 can itself fill and its overflow spout will discharge the excess liquid towards the outside of the apparatus by way of the pouring spout 25, the funnel 26 and the pipe 27.

The filled bottles can be easily removed by turning the frame 8 which brings them successively opposite the door 5, and then their contents can by analysed. These bottles are then replaced by other similar bottles which, after adjustment of the tare elements 17, will be ready for a new fractionation operation.

By means of this apparatus, specific fractions of collected precipitation are obtained which have been led directly to the bottles in which they are to be analysed without having had any stay in any intermediate member. All the radio-active particles contained in these precipitations have therefore been carried to the bottles and sedimentations which may be produced subsequently do not endanger the accuracy of the measurements to be effected.

The application of this apparatus is furthermore in no way limited to the measurement of radio-activity. It could of course be used for any measurement or analysis of collected precipitations since the latter are in no way detrimentally affected in the course of being bottled.

We claim:

1. Fractionizing receiving apparatus for atmospheric precipitation, comprising: a collector having an outlet; a plurality of rocking supports, each for mounting thereon a container for receiving in succession precipitation from said collector; a feeding channel rigidly mounted on each of said rocking supports for disposition above the container of the same support; a funnel rigidly mounted on one of the lateral surfaces of each of said channels on each of said supports and at one end of the respective channel for disposition above the container of the same support with its outlet disposed for communication with the mouth of the container of the same support; the other end of each feed channel being provided at its lower portion with a feed spout for communicating successively with the funnel and with the channel of the support and container to subsequently receive precipitation, said supports being arranged for successive rocking movement between a first position with the mouth of the funnel mounted thereon in communication with said collector outlet and a second position with the feeding chanel in communication with said collector outlet.

2. Fractionizing receiving apparatus for atmospheric precipitation, comprising: a collector having an outlet; a plurality of rocking supports, each for mounting thereon a container for receiving in succession precipitation from said collector; each of said rocking supports comprising a balance beam member supported intermediate the opposite ends thereof, one of the ends of each of the beam members providing a mount for the container, the other end of each of the beam members being loaded with a counter-weight, a feeding channel rigidly connected with the balance beam member of each of said rocking supports for disposition above the container of the same support; a funnel rigidly mounted on each of said supports for disposition above the container of the same support with its outlet disposed for communication with the mouth of the container of the same support; said supports being arranged for successive rocking movement between a first position with the mouth of the funnel mounted thereon in communication with said collector outlet and a second position with the feeding channel in communication with said collector outlet.

3. Fractionizing receiving apparatus for atmospheric precipitation, comprising: a collector funnel in the form of an inverted cone whose apex is provided with a fixed outlet pipe; a plurality of rocking supports, each for mounting thereon a container for receiving in succession precipitation from said collector; a feeding channel rigidly mounted on each of said rocking supports for disposition above the container of the same support; and a funnel rigidly mounted on each of said supports for disposition above the container of the same support with its outlet disposed for communication with the mouth of the container of the same support; said supports being arranged for successive rocking movement between a first position with the mouth of the funnel mounted thereon in communication with said collector outlet pipe and a second position with the feeding channel in communication with said collector outlet pipe for successively feeding a first funnel and a first channel.

4. Fractionizing receiving apparatus for atmospheric precipitation, comprising: a collector having an outlet; a plurality of rocking supports, each for mounting thereon a container for receiving in succession precipitation from said collector; a feeding channel rigidly mounted on each of said rocking supports for disposition above the container of the same support; a funnel rigidly mounted on each of said supports for disposition above the container of the same support with its outlet disposed for communication with the mouth of the container of the same support; said supports being arranged for successive rocking movement between a first position with the mouth of the funnel mounted thereon in communication with said collector outlet and a second position with the feeding channel in communication with said collector outlet and means for limiting the extent of rocking movement of each of said supports between said first and said second positions.

5. Fractionizing receiving apparatus for atmospheric precipitation, comprising: a collector having an outlet; a plurality of rocking supports, each for mounting thereon a container for receiving in succession precipitation from said collector; a feeding channel rigidly mounted on each of said rocking supports for disposition above the container of the same support; a funnel rigidly mounted on each of said supports for disposition above the container of the same support with its outlet disposed for communication with the mouth of the respective container, each of said supports and channel being disposed at a higher elevation than the support and container positioned to subsequently receive precipitation from said collector outlet and arranged for successive rocking movement between a first position with the mouth of the funnel mounted thereon in communication with said collector outlet and a second position with the channel mounted thereon in communication with both the collector outlet and with the funnel of the support of next lower elevation.

6. Fractionizing receiving apparatus for atmospheric precipitation, comprising: a collector having an outlet;

a plurality of containers positioned for receiving in succession precipitation from said collector; a rocking support mounting each of said containers; a feeding channel rigidly mounted on each of said rocking supports and disposed above the containers of the same support; a funnel rigidly mounted on each of said supports and disposed above the container of the same support with its outlet in communication with the mouth of the respective container, one of said supports being arranged for rocking movement between a first position with the mouth of the funnel mounted thereon in communication with said collector outlet and a second position with the feeding channel mounted thereon in communication with said collector outlet; each of the others of said supports being disposed at a higher elevation than the support positioned to subsequently receive precipitation from said collector outlet and arranged for successive rocking movement between a first position with the mouth of the funnel mounted thereon in communication with the channel on the support of next higher elevation and a second position with the channel mounted thereon in communication with both the channel on the support of next higher elevation and with the funnel of the support of next lower elevation.

References Cited by the Examiner

UNITED STATES PATENTS

| | | | |
|---|---|---|---|
| 1,308,855 | 7/1919 | Moore | 73—171 X |
| 2,151,866 | 3/1939 | Nilsson | 73—171 |

FOREIGN PATENTS 1,211,627   10/1959   France.

DAVID SCHONBERG, *Primary Examiner.*